E. EBERLY & W. G. FETROW.
SHEAF HOIST.
APPLICATION FILED JULY 28, 1916.
1,213,604. Patented Jan. 23, 1917.
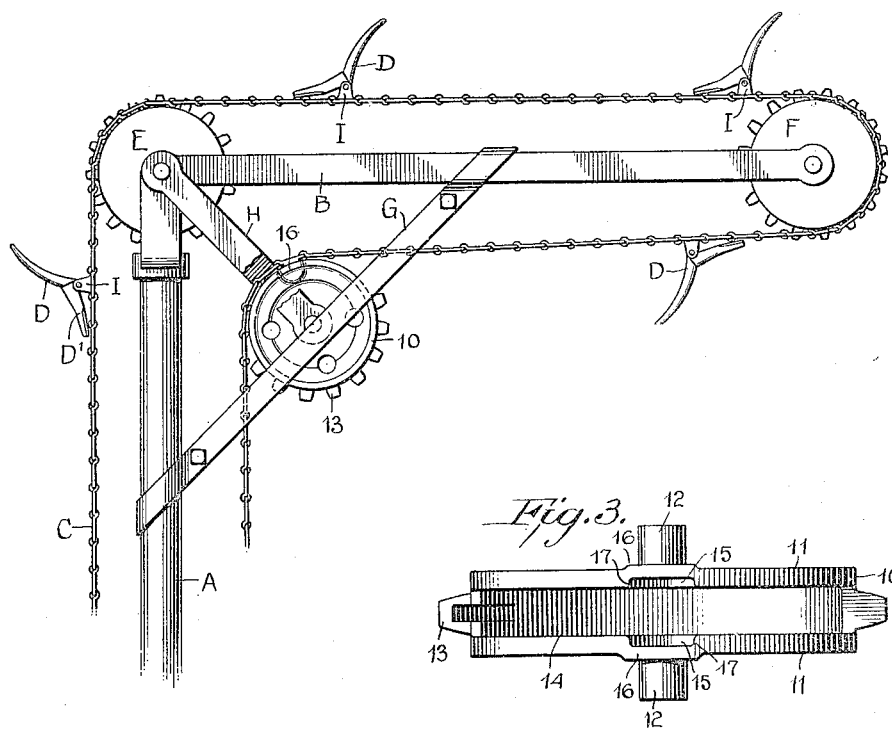
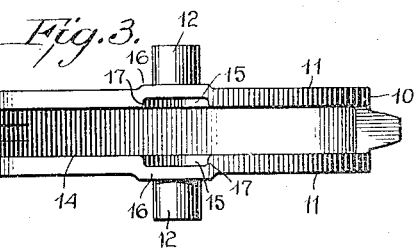
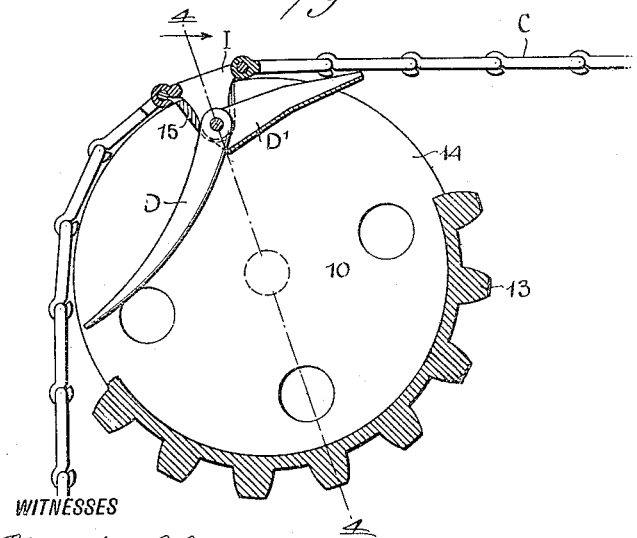
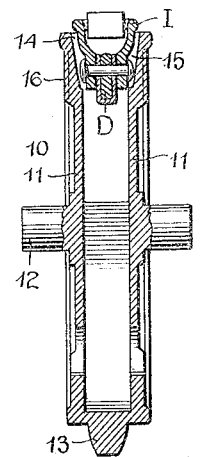
WITNESSES
INVENTORS
Edgar Eberly
William G. Fetrow
BY
ATTORNEYS

UNITED STATES PATENT OFFICE.

EDGAR EBERLY AND WILLIAM G. FETROW, OF MECHANICSBURG, PENNSYLVANIA.

SHEAF-HOIST.

1,213,604.  Specification of Letters Patent.  Patented Jan. 23, 1917.

Application filed July 28, 1916. Serial No. 111,820.

*To all whom it may concern:*

Be it known that we, EDGAR EBERLY and WILLIAM G. FETROW, both citizens of the United States, and residents of Mechanicsburg, in the county of Cumberland and State of Pennsylvania, have invented a new and Improved Sheaf-Hoist, of which the following is a full, clear, and exact description.

Our invention relates to a sprocket pulley more particularly intended for use on sheaf hoists or any equivalent hoisting or conveying device in which a traveling chain having carrier fingers is caused to change its direction on the return run at an entrant angle formed by the movement of the chain in a vertical direction and laterally to and from the vertical direction.

In structures of the character referred to, the carrier fingers on the chain run over a pulley at the entrant angle with the said fingers at the pulley side of the chain.

Our invention provides a pulley which has an opening to receive the carrier fingers passing about the pulley. Also, sprocket teeth on the pulley extend only for a portion of the periphery for direct engagement with the chain links. When a carrier finger is presented to the pulley, however, the chain links are out of driving engagement with the sprocket teeth of the pulley, and when the links and teeth are thus disengaged, the fitting on which the carrier fingers of the chain is pivoted, effects in accordance with our invention a driving engagement with the pulley at the interior, this driving engagement continuing until a direct engagement again takes place between the sprocket teeth of the pulley and the chain links.

The invention will be particularly explained in the specific description following.

Reference is to be had to the accompanying drawings forming a part of this specification in which similar reference characters indicate corresponding parts in all the views.

Figure 1 is a fragmentary side elevation showing a portion of a hoisting apparatus employing a lateral member over which the chain is directed to and from the vertical direction, and in which our improved pulley is employed; Fig. 2 is an enlarged vertical section taken through the pulley in the plane thereof and showing a portion of the chain in engagement therewith; Fig. 3 is a face view of the pulley; Fig. 4 is a transverse section on the line 4—4, Fig. 2.

In the illustrated example of our invention a fragment of a known type of a sheaf hoist is shown, including a post or mast A, a lateral arm B extending therefrom at the top, and a sprocket chain C equipped at intervals with carrier fingers D adapted to receive a sheaf or the like for elevating the same. In this type of hoist the chain runs over an ordinary sprocket pulley E at the up run at the salient of the mast A and arm B and over an ordinary sprocket pulley F at the outer end of the arm B about which pulley F the chain C runs and returns at the under side of the arm B to the salient formed by the said arm and the mast A.

At the salient is positioned our improved pulley designated generally by the numeral 10, the same being here shown as mounted in oblique members G connected by frame members H with the arm B or equivalent members at the axis of the pulley E. The pulley is shown hollow having spaced cheeks 11 and provided with trunnions 12 turning in the structure formed by the elements G—H.

On a portion of the face of the pulley in practice, and usually for something less than half the periphery, the pulley is formed with radial sprocket teeth 13 to engage the links of the chain C. For the remainder of the pulley the face of the same is formed with an opening 14 extending into the hollow interior. The said hollow interior accommodates a carrier finger D with a finger support D' which may be employed, but it does not constitute part of the present invention. Each finger D is pivoted to a suitable fitting I interposed in the chain C at proper intervals. The relation of the sprocket teeth 13 to the chain links is such that as a finger D enters the pulley, the chain links leave the sprocket teeth 13.

In accordance with our invention we provide coacting elements on the chain at the fingers and on the sprocket pulley at the opening to effect driving engagement between the pulley and chain independently of the sprocket teeth 13. For the purpose, lateral recesses 15 are formed at the interior of the pulley in each cheek 11, the material of the cheeks being offset laterally as at 16 to make provision for said recesses.

At the ends the said recesses present transverse shoulders 17 extending laterally outward from the inner faces of the cheeks 11. The arrangement is such that as a finger D approaches the periphery of the pulley 10, said finger will enter the opening 14 and the fitting I will enter the recesses 15 and be engaged by the shoulders 17. Thus, a driving connection between the pulley and the chain at the base of the finger, is effected, to drive the chain after the disengagement of the sprocket teeth 13 and until engagement is again effected between the chain and said sprocket teeth.

Having thus described our invention we claim as new, and desire to secure by Letters Patent:

1. In an apparatus of the character described, the combination of a sprocket chain having carrier fingers, pulleys for the chain guiding the same in paths at angles to each other, so that one run of the chain forms a salient, and a pulley mounted at the salient in position to receive the chain with the fingers thereof disposed toward the pulley, said pulley having an interior space to accommodate a carrier finger and an opening leading from the periphery to said space, co-acting members on the pulley at the interior and on the said chain at the base of the finger to effect driving engagement between the pulley and chain, and sprocket teeth on the pulley for a portion only of the periphery thereof, the periphery at the said opening being untoothed.

2. The herein described sprocket pulley for use with a carrier chain having fingers, said pulley having an interior space to receive a carrier finger, an opening leading from the periphery to the space for the entrance and escape of the finger, means on the pulley at the interior adapted to effect driving engagement between the pulley and the chain at the base of a finger, and sprocket teeth on the pulley for a portion of the periphery thereof adapted to engage the chain links.

3. A sprocket pulley for drive chains having sprocket teeth for a portion of the periphery of the pulley adapted to engage chain links, said pulley having a space within the pulley to receive carrier members on the chain and having a peripheral opening leading to said space, said pulley at the interior thereof having means to engage the chain independently of the sprocket teeth.

EDGAR EBERLY.
WILLIAM G. FETROW.